Oct. 24, 1939.                J. DREW                    2,177,060
                        SEDIMENT INDICATOR
                      Filed April 13, 1938           2 Sheets-Sheet 1
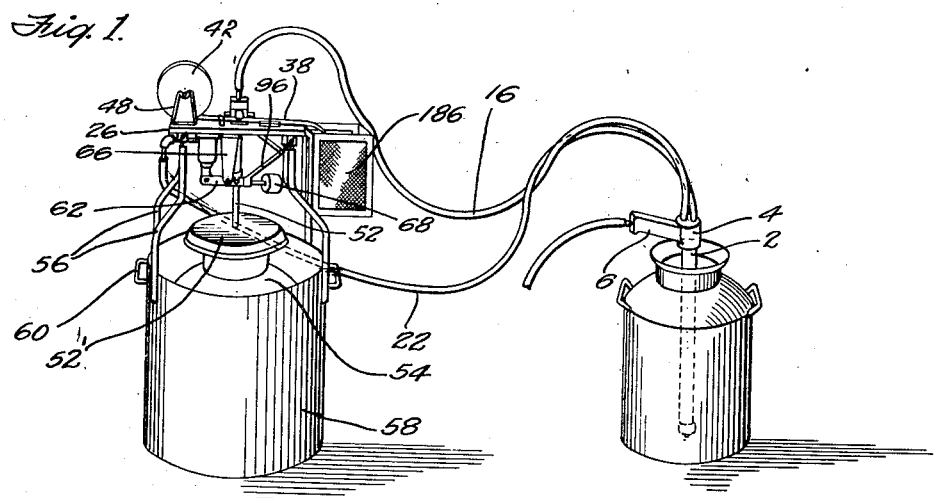
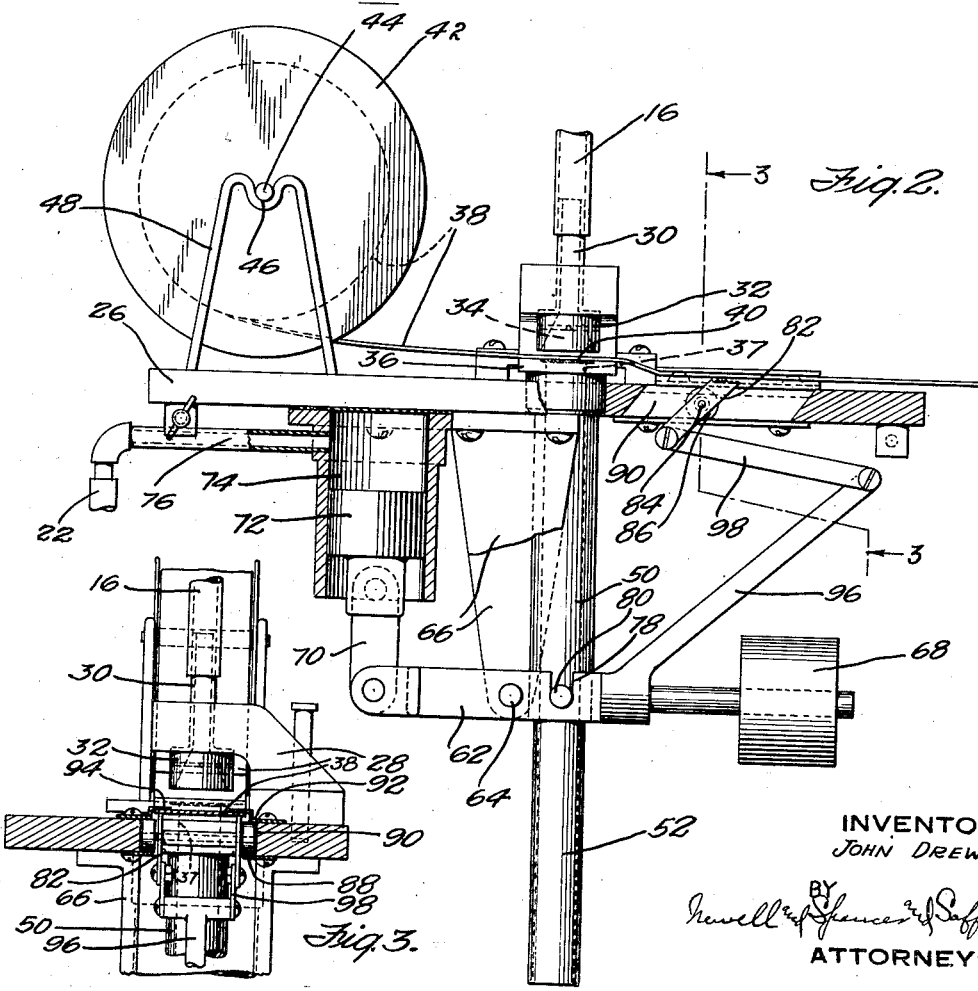
INVENTOR
JOHN DREW
ATTORNEYS

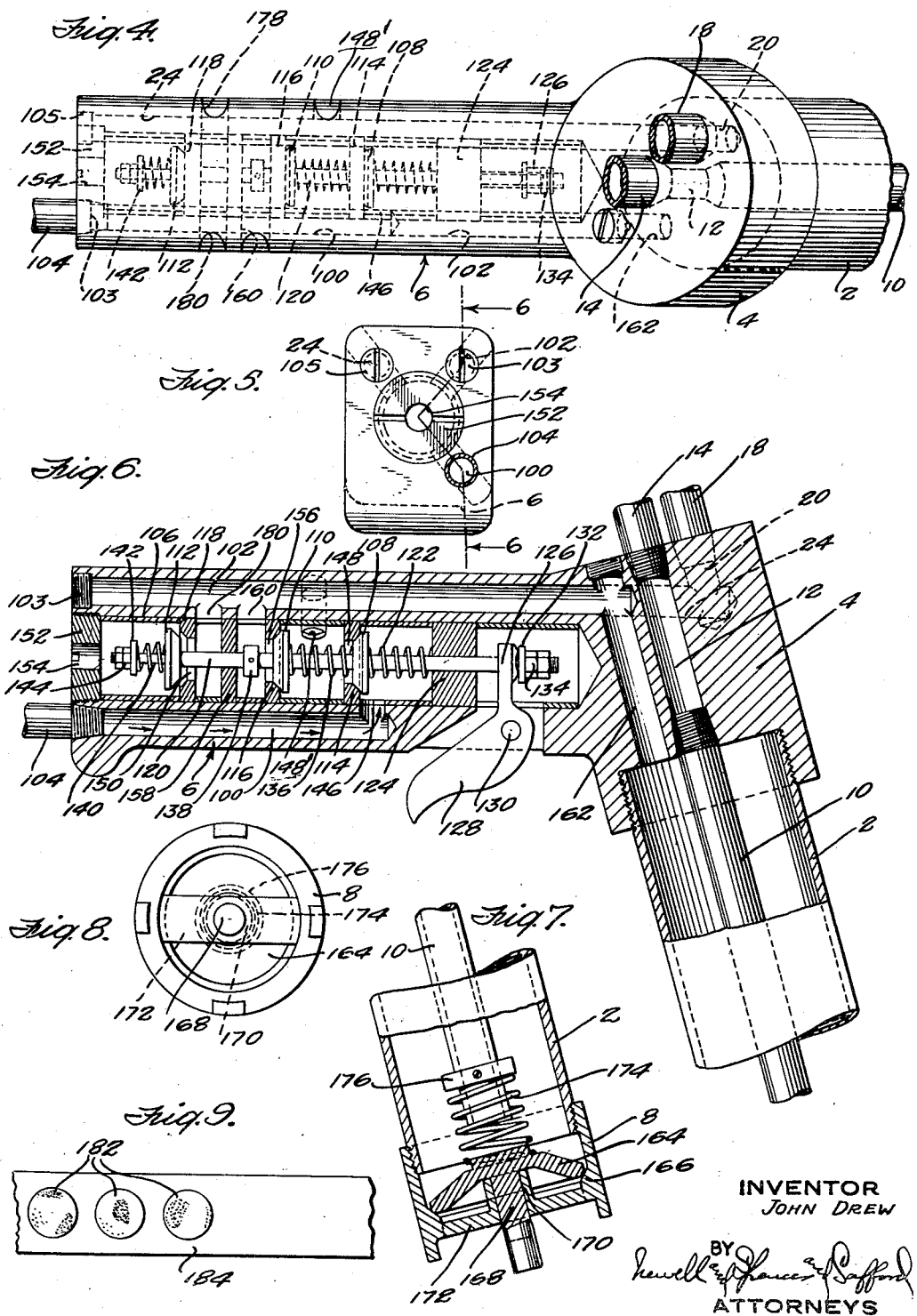

Patented Oct. 24, 1939

2,177,060

UNITED STATES PATENT OFFICE 2,177,060

SEDIMENT INDICATOR

John Drew, Binghamton, N. Y.

Application April 13, 1938, Serial No. 201,765

8 Claims. (Cl. 73—51)

This invention relates to improved means for obtaining an indication of the amount and character of the sediment in a liquid such, for example, as milk, and has for its general object not only to provide means for this purpose which will give a more accurate indication of the amount and character of sediment in the liquid than devices heretofore in use, but also to provide means which can be operated with such facility as not to interfere appreciably with the handling of the milk or other liquid, especially at receiving stations.

Heretofore various devices have been devised for producing an indication of the amount and the character of sediment in a selected sample of milk by causing the milk to be filtered through a disc of filtering material on which the sediment is deposited, but such devices have required considerable manipulation, have been difficult to maintain in sanitary condition and have been so complicated and required so much time for their operation that their use has interfered appreciably with the operations of receiving milk at milk-receiving stations. The present invention aims, therefore, to provide apparatus which requires only a single hand of the operator to operate it to obtain both the test sample and the sediment indication, which is so easily manipulated that it does not interfere at all with the movement of the milk container as it travels along the milk-receiving line, which is so simple in construction that it can readily be disassembled in all parts with which the milk comes into contact, whereby it can readily be cleansed, and which is so compact that it does not take up much room and therefore can conveniently be placed for sediment sampling in practically any existing milk-receiving station.

An important feature of the invention is the use of the compressed air with which practically all milk-receiving stations are now equipped for effecting the operation of transferring the milk sample from the producer's container to and through the filtering disc or strip and the feeding into and clamping in sediment receiving position of successive filter sections all in a predetermined sequence determined by the substantially continuous movement of a single finger of the hand with which the sediment sampler is being manipulated.

Another important feature of the invention is the arrangement of the filtering material and the mechanism for feeding successive operations thereof into sampling position so that the sample for a particular producer can readily be marked for identification.

Other objects and important features of the invention will appear from the following description and claims, when considered in connection with the accompanying drawings, in which Figure 1 is a perspective view of the combined sediment sampling and sediment indicating apparatus embodying the present invention, this view showing the indicating part of the apparatus mounted in position over an ordinary 40-quart milk can into which the filtered samples of the milk are discharged and showing the sampling part of the apparatus in position in a producer's can from which the sample to be tested is to be taken;

Figure 2 is a side elevation with parts in section of the test table, strip clamping and feeding means and the associated operating mechanism;

Figure 3 is a section on the line 3—3 of Fig. 2;

Figure 4 is a plan view of the handle portion of the sampler, showing in dotted lines the internal mechanism thereof;

Figure 5 is an end view of the handle portion of the sampler;

Figure 6 is a section on the line 6—6 of Fig. 5;

Figure 7 is a section through the bottom end of the sampler showing the construction of the valve which traps the sample in the sampler preparatory to its transfer to the filtering table;

Figure 8 is a bottom plan view of the parts shown in Fig. 7, and

Figure 9 is a portion of the tape showing the way successive sediment samples are located upon and appear upon the filter tape.

As hereinabove suggested, the sediment sampling mechanism of the present invention comprises two parts all operated from a single control, one being a device for obtaining a sample of the milk to be tested for its sediment, this device being designed to obtain the sample from that part of the container in which the sediment is most likely to collect. This device is sometimes referred to as the sampler or sample trapping device, since it picks up or traps within it the sample to be tested. The other part of the apparatus is connected to the sample trapping device or sampler by two tubes or conduits through one of which the sample of milk can be transferred and through the other of which the compressed air for operating the clamping and feeding mechanism travels.

In the illustrative embodiment of the invention, the device for obtaining a selected sample of the producer's milk from the region in which sediment is apt to collect comprises a cylinder or length of metal tubing 2, which at one end is screwed into a casting 4 having a handle grip portion 6 and at the other end is screwed into a cylindrical casting 8 which carries the valve mechanism for trapping the sample hereinafter to be described. The cylinder or tubing 2 is preferably of such length that it will extend, with its associated casting 8, to the bottom of a 40-quart milk can when the handle 6 is substantially in the position shown in Fig. 1.

Extending down through the center of the cylinder or tube 2 is a smaller tube 10 threaded at its upper end into the lower end of a passage 12 through the casting 4, the tube 10 stopping short of the lower end of the tube 2, as shown in Fig. 7. A nipple 14 is screwed into the upper end of the passage 12 to provide means for attachment of a hose 16 for conducting the milk from the sampler to the testing apparatus. A second nipple 18 screwed into a passage 20 in the casting 4 provides a connection for the hose 22 for carrying operating air from the passage 24 in the handle 6 to the pneumatic means for operating the filter strip clamp on the test table.

The testing mechanism proper or means for producing the sediment indication comprises a table 26 upon which is mounted a gooseneck 28 through which extends a tube 30 connected to the hose 16 and having at its lower end an enlarged portion 32 with a bell-mouth opening 34, the part 32 constituting the stationary member of a clamp between which and a movable member 36 the filter tape 38 is clamped. The movable clamping member 36 has an opening 37 opposed to the bell-mouth 34 and covered with a screen 40. The filter tape 38 is preferably carried on a spool 42 which is shown as having trunnions 44 resting in depressions 46 in brackets 48 mounted on the table 26. The movable clamping member 36 is carried upon the upper end of a vertically movable tubular member 50, with the hollow interior of which the opening 37 communicates. The lower reduced extension 52 of the movable tubular member 50 may extend, as shown, through the cover 52' of a can 54 into which the various filtered samples are discharged.

For convenience in handling the testing part of the apparatus, the table 26 may be mounted upon legs 56 connected to a hollow sheet metal cylinder 58 of an internal diameter sufficient so that the cylinder may surround an ordinary milk can. The cylinder 58 may further be provided with handles 60 so that the testing part of the apparatus may conveniently be lifted bodily and placed over another can when the first can with which it has been used has become filled with the filtered samples.

The mechanism for effecting the movement of the tubular member 50, and with it the movable clamping member 36, into and out of clamping relation to the stationary part 32 of the filter strip clamp comprises a lever 62 fulcrumed on a shaft 64 carried in brackets 66 connected to the under side of the table 26, one end of the lever 62 being provided with a counterweight 68 and the other end being connected by a link 70 to a piston 72 in a compressed air cylinder 74 having a compressed air inlet 76 connected to the hose 22. The lever 62 is of forked construction and each of the fork members is provided with a slot 78 that receives a trunnion 80 on the tubular member 50.

From the foregoing description it will be seen that when compressed air enters the cylinder 74 through the inlet 76 it will move the piston 72 downward and through its connections with the lever 62 rock the lever in the direction to move the tubular member 50 and with it the attached clamping member 36 into clamping relation to the stationary member 32, thus clamping the filter tape 38 in liquid-tight position between the bell-mouth 34 of the stationary clamping member and the opening 37 in the movable clamping member.

In order to provide for automatic feeding of a clean section of the filter tape 38 into position between the clamping members 32 and 36 when a sediment indication has been produced and while the clamping members are moving into tape-releasing position, feeding mechanism is preferably provided which is so connected to the lever 62 that the movement of the lever into clamp-opening position will effect the feeding movement of the feeding mechanism. The illustrated feeding mechanism comprises toothed feeding dogs 82 carried on a shaft 84 provided at its ends with rollers 86 travelling in guides formed between lower plates 88, connected to the under side of the table 26 and overlapping a slot 90 in the table 26 in which the feeding mechanism travels, and upper plates 92, also overlapping the edges of the slot 90 and each having an integral offset extension 94 overlapping the edge of the tape 38 and furnishing a backing against which the dog 82 can press the tape to secure the desired feeding grip thereon.

The feeding movement of the dogs 82 is effected through connections to that arm of the lever 62 which carries the weight 68, these connections comprising a bracket arm 96 fixed upon the weight arm of the lever 62 and links 98 connecting the outer T-shaped end of the bracket arm 96 to the lower ends of the dogs 82.

From the foregoing description it will be seen that when the compressed air is released from the cylinders 74 both the weight of the tubular member 50 and the counterweight 68 tend to move the weight arm of the lever 62 downward and thus move the piston 72 upward. As the weight arm of the lever 62 moves downward it carries with it the bracket arm 96 which through its link connections 98 with the dogs 82 both rocks the dogs 82 on the shaft 84, to bring them into gripping engagement with the under side of the tape 38, and at the same time causes the dogs to travel bodily on their rollers 86 to the right in Fig. 2, thus feeding the strip to carry the portion on which a sediment indication has just been made out from its position between the clamp members 32 and 36 and to bring a clean portion of the strip 38 into position between the clamp members.

The valve mechanism for controlling the compressed air through which the various operations hereinabove described are carried out will now be described: The handle part 6 of the sampler is provided with three longitudinally extending compressed air passages 100, 102 and 24. A nipple 104 screwed into the end of the passage 100 permits the connection to this passage of a hose from the source of supply of compressed air. The ends of the passages 102 and 24 are respectively closed by screw plugs 103 and 105.

The central part of the handle 6 is bored out to form a chamber 106 in which the valves controlling the various passages and the supports, guides and seats therefor can be located. As herein shown, there are three valves 108, 110, and 112, with their associated valve seats formed in partition members 114, 116 and 118, respectively. The valve 108 is connected to the valve-operating rod 120 to move directly therewith against the tension of a spring 122 located between the valve 108 and another partition member 124. The valves 110 and 112 are slidable upon the rod 120 and permit movement of the rod through them as hereinafter set forth.

The rod 120 which slides through a substantially airtight guideway in the partition member 124 extends also through an opening in the upper arm 126 of the trigger 128, this opening through the arm 126 being large enough to allow the trigger to rock freely on its pivot 130 without bringing lateral pressure to bear on the rod 120. A rounded face of the arm 126 bears against a washer 132 held in proper adjusted position on the rod 120 by lock nuts 134 so that the pressure of the finger on the trigger 128 to move it in a clockwise direction in Fig. 6 tends to move the rod 120, and with it the valve 108, toward the right in Fig. 6 against the tension of the spring 122 which tends to keep the valve 108 against its seat in the partition member 114.

The initial opening of the valve 108 does not effect the opening of the valve 110, which is held against its seat in the partition 116 by the spring 136, the rod 120 sliding through the valve 110 until it has moved a sufficient distance to bring the collar 138, attached to the rod 120, into engagement with the face of the valve 110 remote from the spring 136. The initial movement of the valve 108 does, however, effect the closing of the valve 112 which moves against its seat in the partition 118 by reason of the pressure of the initially untensioned spring 140 on valve 112, the spring being confined between the valve 112 and a washer 142 held on the rod by lock nuts 144.

The opening of the valve 108 by the initial movement of the trigger 128 just described permits the compressed air, which enters the chamber between the partitions 124 and 114 from the compressed air passage 100 through the opening 146, to pass through the valve opening 148 into the chamber between the partitions 114, 116 and through the opening 148' by which this chamber communicates with the passage 24, then through the passage 24 into the passage 20 and out through the nipple 18 and hose 22 to the air inlet 76 into the cylinder 74, thus operating the clamping mechanism hereinabove described, whereby the clamp member 36 is brought into clamping relation to the clamping member 32 to provide a laterally liquid-tight communication from the bell-mouth 34 to the opening 37 through the filter tape 38. The closing of the valve 112 at the time the valve 108 is opened prevents the compressed air from again escaping through the valve opening 150 into the chamber between the partition 118 and the screw plug 152 forming the removable end of the compartment 106 and in which there is a vent opening 154 to the atmosphere.

Further movement of the trigger 128 in a clockwise direction, Fig. 6, brings the collar 138, attached to the rod 120, into engagement with the face of the valve 110 opposite that on which the spring 136 bears and moves the valve 110 away from its seat in the partition 116 and thus permits the compressed air also to pass through the valve opening 156 into the chamber between the partitions 116 and 158 and through the opening 160 into the passage 102 which communicates with a vertical passage 162 extending through the casting 4 and opening into the upper end of the tube or cylinder 2 of the sample trapping device. The lower end of the tube or cylinder 2 is normally closed by means of a valve 164 carried by the cylindrical casting 8 screwed upon the lower end of the tube 2. The valve 164 is normally pressed against a seat 166 in the cylindrical casting 8 and has a central stem 168 guided in an opening 170 in a spider 172, either screwed into or forming an integral part of the casting 8, the stem 168 extending a sufficient distance below the lower end of the casting 8 so that when the sampler is pushed down to the bottom of a milk can the stem 168 will engage the bottom and push the valve into open position against the tendency of a spring 174, bearing at one end against the valve and at the other end against a collar 176 fixed on the tube 10, to maintain it in closed position.

The sampler having been lifted so that the valve is permitted to resume its closed position before the trigger 128 is pressed to open valve 108, if the trigger be now pressed far enough to open valve 110, the compressed air entering the tube or cylinder 2 through the passage 162 will force the milk in the cylinder 2 up through the tube 10, passage 12, nipple 14 and hose 16 and thus drive it down through the tube 30, connected to the hose 16, through the section of the filter tape 38 clamped between the clamp members 32 and 36, as a result of the prior opening of the valve 108, and into the tubular member 50 and its extension 52 and then into the receiving can 54 for the filter samples, thereby leaving any sediment it may contain on the section of tape 38 between the clamp members or rather on the portion thereof lying between the communicating openings 34 and 37 in the clamp members.

Upon release of the trigger 128, the valve 110 will be the first to close and this will then be followed by the closing of the valve 108 and the substantially simultaneous opening of the valve 112. As the valve 108 is closed, communication with the source of compressed air is shut off and the compressed air which has been introduced into the apparatus is then released through openings 178 and 180 forming communications respectively between the passage 24 and the space between the partitions 158 and 118 and between the passage 102 and the same space between the partitions 158 and 118. The valve 112 being now open, this compressed air can pass out through the valve opening 150 and the vent opening 154.

The compressed air having been vented, the weight 68 is free to move downward, thus raising the piston 72, lowering the clamp member 36 and feeding a clean section of the tape 38 into position between the clamp members 32 and 36. The pressure of the compressed air is also taken off the sampler and it is again ready to be used to pick up a new sample.

In order to identify the portions of the tape on which the sediment indications for a particular producer are located, the producer's identifying number or other identifying means may be placed upon the tape either across the tape between successive series of sediment indications, or the tape may be provided with a sufficient margin to allow the placing of the indication on the margin. As will be seen in Fig. 9, the successive sediment indications 182 may be sufficiently spaced to provide for producer identification between successive series or the tape may be sufficiently wide so that a margin 184 is provided on which the identification may be placed. The tape being formed usually of some felted material such as cellulose fibres, if desired the margin of the tape upon which the identifying indications are to be placed may be provided with some suitable sizing to provide a better writing surface.

As shown in Fig. 1, any suitable receptacle 186 may be provided for receiving the tape as it passes off the table 26, as a result of the successive feeding operations.

What is claimed as new is:

1. Apparatus for testing liquids for sediment having, in combination, means for trapping a sample of the liquid to be tested, means for holding filtering material in position to pass the liquid sample therethrough, comprising opposed conduits relatively movable into and out of filtering material clamping relation to each other, one of said conduits being connected to said sample trapping means, pneumatically operable means for effecting the relative clamping movement of said conduits, means for connecting said pneumatic means and also said sample trapping means to a source of compressed air, said means including valves for controlling the admission of the compressed air into said connections.

2. Apparatus for testing liquids for sediment having, in combination, means for trapping a sample of the liquid to be tested, means for holding filtering material in position to pass the liquid sample therethrough, comprising opposed conduits relatively movable into and out of filtering material clamping relation to each other, one of said conduits being connected to said sample trapping means, pneumatically operable means for effecting the relative clamping movement of said conduits, means for connecting said pneumatic means and also said sample trapping means to a source of compressed air, said means including valves for controlling the admission of the compressed air into said connections, and means for insuring the operation of said valves in a predetermined sequence.

3. Apparatus for testing liquids for sediment having, in combination, means for trapping a sample of the liquid to be tested, means for holding filtering material in position to pass the liquid sample therethrough, comprising opposed conduits relatively movable into and out of filtering material clamping relation to each other, one of said conduits being connected to said sample trapping means, pneumatically operable means for effecting the relative clamping movement of said conduits, means for connecting said pneumatic means and also said sample trapping means to a source of compressed air, said means including valves for controlling the admission of the compressed air into said connections, and means for moving the used filtering material out of alinement with said conduits operable by the relative movement of said conduits out of clamping relation to each other.

4. Apparatus for testing liquids for sediment having, in combination, means for trapping a sample of the liquid to be tested, pneumatically operable means for clamping filtering material in position to pass the liquid sample therethrough, comprising opposed conduits relatively movable into and out of clamping relation to each other and one of which is connected to said sample trapping means, and means for connecting said pneumatically operable means and also said sample trapping means to a source of compressed air, said connecting means including valves for controlling the admission of the compressed air thereinto, and a single operating means for said valves constructed to insure their operation in a predetermined sequence.

5. Sample trapping and transferring means for sediment testing apparatus comprising a tube having a check valve at the lower end thereof and having a transfer conduit for the sample to be tested opening thereinto near said lower end, means for closing all exits from said tube except through said conduit, and means for admitting compressed air into said tube to eject the liquid sample, trapped therein by said check valve, through said conduit.

6. Apparatus for testing liquids for sediment having, in combination, sample trapping and transferring means including a tube having a check valve at the lower end thereof, a conduit for the sample to be transferred opening into said tube near said lower end, pneumatically operable means for clamping filtering material in position to pass the transferred liquid sample therethrough, including a part of said aforementioned conduit and an opposed conduit relatively movable into and out of clamping relation to each other, and means for connecting said apparatus to a source of compressed air, including means for controlling the admission of compressed air to said pneumatically operable clamping mechanism, means for closing all exits from said sample trapping tube except through said conduit and means for thereafter admitting compressed air to said sample trapping tube to cause the sample to be forced through said transfer conduit.

7. Apparatus for testing liquids for sediment having, in combination, means for trapping a sample of the liquid to be tested, including a tube having a check valve near its lower end, a vent communicating with its upper end and an inlet for compressed air, means for holding filtering material in position to pass the liquid sample therethrough, comprising opposed conduits between which said filtering material is located and one of which is connected with said sample trapping means, and means for closing said vent when compressed air is to be admitted to said sample trapping means.

8. Apparatus for testing liquids for sediment having, in combination, means for trapping a sample of the liquid to be tested, including a tube having a check valve near its lower end and a vent communicating with its upper end, means for holding filtering material in position to pass the liquid sample therethrough, comprising opposed conduits between which said filtering material is located and one of which is connected with said sample trapping means, means including a controlling valve for effecting an operating connection between said sample trapping means and a source of compressed air, a valve for closing and opening the aforementioned vent and means for insuring the operation of said valves in a predetermined sequence.

JOHN DREW.